United States Patent [19]

Carpenter et al.

[11] 4,372,670
[45] Feb. 8, 1983

[54] PRECESSION SCANNING SYSTEM

[75] Inventors: Vance J. Carpenter, Fairport; Abbott Smith, Webster, both of N.Y.

[73] Assignee: Xerox Corporation, Stamford, Conn.

[21] Appl. No.: 237,032

[22] Filed: Feb. 23, 1981

[51] Int. Cl.³ .................. G03B 27/48; G03G 15/00
[52] U.S. Cl. .............................. 355/8; 355/51; 355/66
[58] Field of Search .................. 355/8, 5, 55, 56, 57, 355/60, 51, 66, 77

[56] References Cited

U.S. PATENT DOCUMENTS

| | | | |
|---|---|---|---|
| 3,454,335 | 7/1969 | Caldwell et al. | 355/8 |
| 3,650,621 | 3/1972 | Lewis et al. | 355/8 |
| 3,754,822 | 8/1973 | Melrose | 355/8 |
| 4,040,733 | 8/1977 | Satomi | 355/8 |
| 4,145,136 | 3/1979 | Takahashi | 355/8 |
| 4,212,532 | 7/1980 | Suzuki | 355/8 X |
| 4,232,960 | 11/1980 | Glab | 355/8 |

Primary Examiner—A. C. Prescott

[57] ABSTRACT

An imaging system is provided for scanning stationary objects in an object plane and projecting the image onto a moving flat photoreceptor in such a manner that the image moves in a direction opposite the photoreceptor movement. In a preferred embodiment, the scanning illumination elements comprise a modified dual rate mirror system where the second mirror is moving at less than ½ the speed of the scan mirror thereby causing a resultant increase in platen-to-lens distance. This increase is compensated for, and image precession obtained, by moving the lens and mirror assembly along the optical axis in a direction opposed to that of the photoreceptor.

8 Claims, 3 Drawing Figures

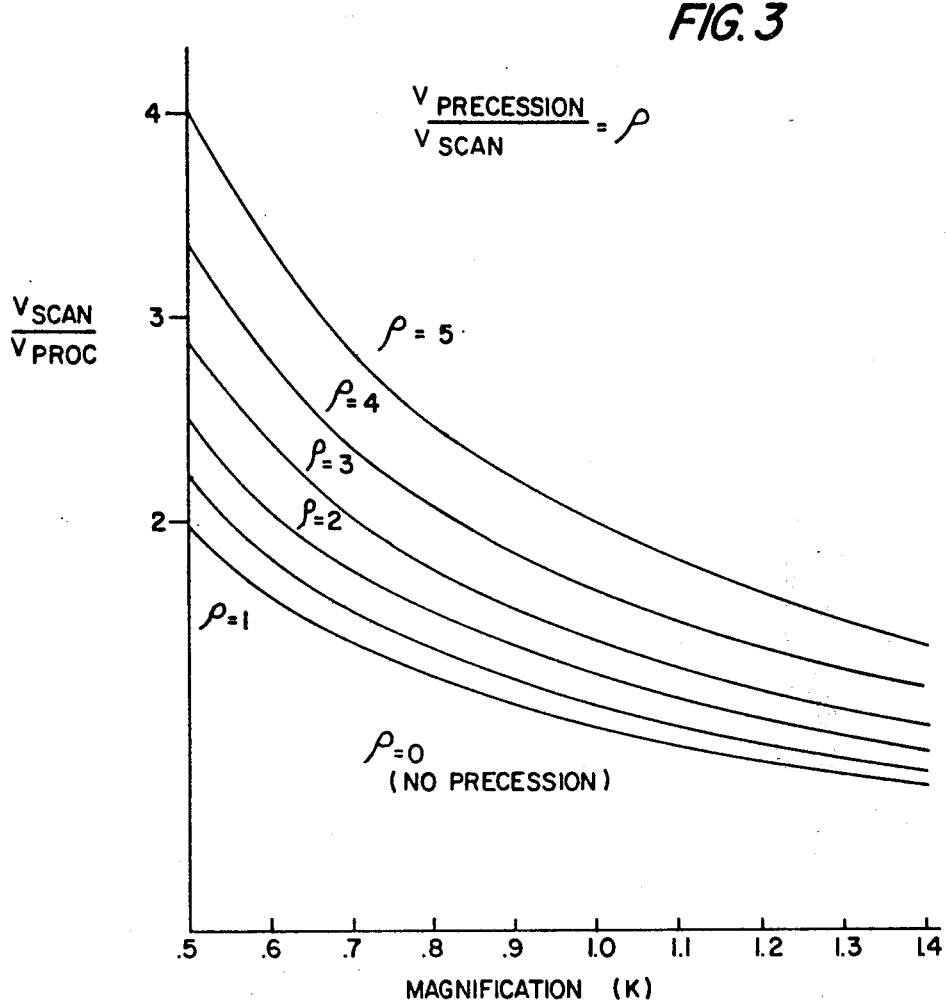

PRECESSION SCANNING SYSTEM

BACKGROUND AND PRIOR ART STATEMENT

This invention relates generally to a document scanning system and, more particularly to an optical system in which a document, lying in an object plane, is scanned and the scanned image is projected onto a moving flat photoreceptor at a rate faster than the rate of movement of the photoreceptor and in the direction opposite such photoreceptor movement.

Precession scan systems which expose images on a photoreceptor at a faster rate than the photoreceptor movement are known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed, (i.e. moved in a direction opposite to the drum motion) onto the drum surface by means of a slit aperture which moves in a direction opposite that of the drum. This combined slit and drum rotation exposes the drum at a speed (rate) that is greater than the surface speed of the drum. This scanning system demonstrates two of the advantages gained by image precession: the process speed of the system can be set at a lower speed for equivalent copy rate (copies per minute) and the gap ordinarily present between images (due to the return time of the scan optics) can be reduced or eliminated if desired. Scan return velocities for a given copy rate can also be minimized for a given copy rate thus reducing scan accelerations, forces and vibrations. A problem with such a system, however, is that defocusing errors may result in developed images unacceptable for some systems. The errors are introduced because the image reflected from the drum mirror to the slit does not maintain perpendicularity to a tangential line at the drum surface.

This defocusing problem is addressed in U.S. Pat. No. 4,232,960 (Glab) assigned to the same assignee as the present invention. Glab solves the problem of field tilt in his particular scan system, by using linear and rotational motions of optical elements located near the drum surface to scan the image onto the drum at the angle corresponding to the angle of reflection of the image from the platen.

Another prior art device which utilizes precession onto a drum photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan document on a curved platen onto the drum.

Precession onto a flat photoreceptor surface introduces different problems requiring a different set of solutions. U.S. Pat. No. 3,754,822 (Melrose) also assigned to the same assignee as the present invention, discloses a scan system wherein a platen and flat photoreceptor move synchronously in the same direction and the scan optics move in the opposite direction at a suitable speed. The disclosure and claims are limited to the specific system disclosed and do not address problems in systems which, for example, have a stationary object or which have a lens movement separate from that of a scan lamp movement. In higher volume copiers, a preferred method of scanning has been to utilize a full-rate, half-rate mirror system which maintains proper object-to-lens distance during the course of travel. Such a scan system is relatively heavy, however, and the above-mentioned flyback inertial problems constitute an important limitation on the speed of the system.

Precession onto a flat photoreceptor surface is also disclosed in copending U.S. Application Ser. No. 190,160, filed Sept. 24, 1980, assigned to the same assignee as the present invention. In this application, an object is imaged onto a photoreceptor by an illumination scanning system which is moving at a faster rate than the photoreceptor.

SUMMARY

The present invention provides a scanning system which precesses an image from a stationary object onto a flat photoreceptor thereby reducing or eliminating the "dead" space on the photoreceptor normally formed during the return of scan time interval.

This is accomplished by changing the normal relative velocities of a pair of scanning mirrors (i.e. from a $1:\frac{1}{2}$ ratio) to a larger relative ratio ($1:\frac{1}{3}$ ratio in a preferred embodiment). This change in the ratio of scanning mirror rate decreases the platen-to-lens distance by an amount which equals the amount of precession desired at the photoreceptor surface. Compensation for this change is obtained by moving the lens and photoreceptor mirror along the optical path a distance equal to the precession distance, thereby causing the scanned and projected image to advance along the photoreceptor in a direction opposite to the belt movement a distance equal to the precession distance.

FIG. 3 is a plot of scan/process velocity ratio against system magnification value.

Figure 1:
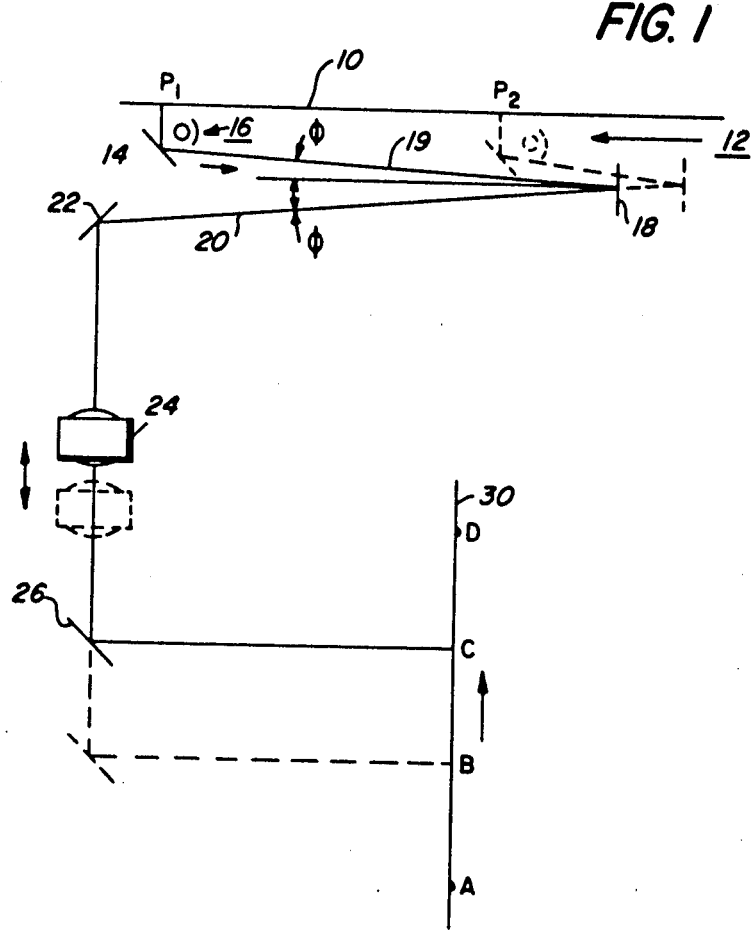
FIG. 1 is a schematic diagram of a precession scan and imaging arrangement according to the invention in which the photoreceptor is perpendicular to the platen.

Referring now to FIG. 1, there is shown a 1:1 precession imaging system utilizing a modified full-rate/half-rate mirror system and a moving lens and belt mirror. A document 10, having a scan length defined by points $P_1P_2$ is supported on a platen (not shown). The document is scanned by a modified dual rate mirror assembly generally designated as 12. Assembly 12 comprises a first mirror 14 and lamp assembly 16 moving at a first velocity $V_{m1}$ and a second mirror 18 moving at a second velocity $V_{m2}$ which is some value $<0.5\ V_{m1}$. An image of the document object points, represented by a ray 19 traveling along optical path 20, is scanned by mirror 14 and reflected towards mirror 18. The ray strikes mirror 18 at an angle $\phi$ with respect to the mirror normal which is parallel to the object plane. The ray is reflected from moving mirror 18 and folding mirror 22 into lens 24. Lens 24 and photoreceptor mirror 26 are movable along the optical path at a third velocity $V_L$ where $$V_L = (V_{m1} - 2\ V_{m2}) \cos \phi \tag{1}$$

The projected image is reflected onto photoreceptor belt 30 which is moving at a fourth velocity $V_B$ (the process speed).

$$V\ \text{process} = V\ \text{scan} - V\ \text{precession} = V_{m1} - V_L \tag{2}$$

In operation, and at the start of scan, components 14, 16, 18, 24 and 26 are in their solid line positions. A portion AC of belt 30 is equal in length to document points P₁P₂ with point C defining the image point of document point P₁. Mirror 14 and lamp assembly 16 move from left to right at velocity $V_{m1}$. Mirror 18 also moves from left to right at the second velocity $V_{m2}$. Since this velocity is less then ½ of the velocity of $V_{m1}$, the platen-to-lens distance begins to decrease. To compensate for this decrease, and also to thereby implement the precession imaging, lens 24 and mirror 26 are moved at the third velocity $V_L$. The projected image is therefore "walked" along belt 30 (precessed) in a direction opposite to that of the belt. At the end of scan, all the movable components are in their dotted line position. Belt 30 has moved to position BD with document point P₂ being imaged at point B. The precession distance BC divided by belt velocity $V_B$ provides an added increment of "free" flyback time. In other words, the time requirements for returning the movable components to the start of scan position can be relaxed since the belt must travel to at least point C before the next scan cycle can begin. The values of precession distance BC can be varied by changing the relationships between the $V_{m1}$, $V_{m2}$, $V_L$ and $V_B$. Depending on the relationship, each scan cycle can begin again at point C thereby eliminating completely an interdocument gap. However, for some systems, some amount of interdocument gap may be necessary and desirable, e.g. to allow copy paper to be properly synchronized with the image on the photoreceptor. The precession rate can therefore be set to allow for a longer flyback time to provide a desired "dead" space between images. A longer flyback time also has the desirable effect of reducing system acceleration and vibrations.

Figure 2:
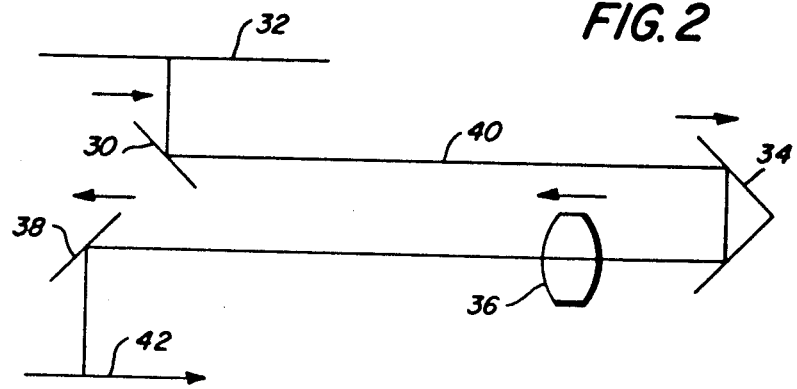
FIG. 2 is a schematic diagram of a precession scan and imaging arrangement according to the invention in which the photoreceptor is parallel to the platen.

The relationship of the various component velocities expressed in Equation (1) holds true for an optical system wherein the photoreceptor plane is perpendicular to the object plane. FIG. 2 shows a second optical system wherein the photoreceptor plane is parallel to the object plane. In this system, mirror 30 scans a document on platen 32 at a velocity $V_{m1}$. Roof mirror 34 is moving at a second velocity $V_{m2} < 0.5\ V_{m1}$. Lens 36 and mirror 38 are movable along the optical path 40 at a third velocity $V_L$ the precession velocity. The projected image is reflected onto photoreceptor belt 42, the belt moving at a fourth velocity $V_B$. For this arrangement, the angle $\phi$ is zero and therefore equation (1) can be written as $$V_L = V_{m1} - 2 V_{m2} \qquad (3)$$

In operation, the optical system functions in the same manner as the FIG. 1 system.

Turning now to some possible speed relationships, in theory any value for the $V_B/V_{m1}$ ratio can be selected by adjusting the value of $V_{m2}$. In practice, however, there are some physical constraints, e.g. the second mirrors must be a sufficient distance from the scan mirrors at start of scan to clear the scan mirror at end of scan. Also, because of the combined mass of the lens and photoreceptor mirrors $V_L$ must be kept within reasonable limits. Since present system designs rely upon various cable arrangements to move the various optical components, straightforward half and quarter rate link would be preferable. Magnification requirements also impose certain restrictions on the type of system. Some of these considerations, and some optimum designs for the arrangement typified by FIG. 2, are discussed below. These results are easily extended to other arrangements by incorporation of the cosine correction factor indicated in Equation (1).

EXAMPLE I

Set mirror 18 at a velocity $V_{m2}$ of 0.25 $V_{m1}$. Then $V_L = 0.5\ V_{m1}$ and $V_B = 0.5\ V_{m1}$.

By selecting a ¼ value for $V_{m2}$, only half and quarter rate linkages would be required. If mirror 14 is set to scan at 16″/sec, precess speed would be 8″/sec which provides a 0.6 sec precession time. This value, however, as seen in a subsequent discussion on magnification, is suitable only in a 1:1 mode.

EXAMPLE II

Set mirror 18 at a velocity $V_{m2}$ of 0.33 $V_{m1}$ and move lens 24 at the same velocity. This yields a process speed $V_B$ of 0.67 $V_{m1}$. Since $V_L$ is made to equal $V_{m2}$, the implementation thereof can be made by appropriate path—cable arrangements.

The above examples have provided working arrangements at unity magnification modes. If the system is to operate in a multi-magnification mode, it should be designed so that process $V_B$ and precession $V_L$ velocities are constant and independent of magnification. At magnification K, $$V\ \text{process} = KV\ \text{scan} - V\ \text{precession} \qquad (4)$$

or where V scan is scan velocity at magnification K. Then, $$\frac{V\ \text{process}}{V\ \text{scan}} = K - \frac{V\ \text{precession}}{V\ \text{scan}} \qquad (5)$$

If oV scan is scan velocity at 1×, then $$V\ \text{scan} = \frac{oV\ \text{scan}}{K} \text{ and} \qquad (6)$$

$$\frac{V\ \text{process}}{V\ \text{scan}} = K - \frac{KV\ \text{precession}}{oV\ \text{scan}} = K\left(1 - \frac{V\ \text{precession}}{oV\ \text{scan}}\right)$$

inverting $$\frac{V\ \text{scan}}{V\ \text{process}} = \frac{1}{K\left(1 - \frac{V\ \text{precession}}{oV\ \text{scan}}\right)} \qquad (7)$$

A plot of the scan/process velocity ratio against values of (V precession/oV scan) and K is shown in FIG. 3. It is noted that the non-precession case plot provides the lowest ratio (2.0). In each precession plot, the scan velocity increases as magnification (K) decreases with the upper values becoming increasingly unacceptable. For example, for the scan ratios for Example I (P=0.5), the V scan/V process ratio increases from 2.0 at 1.0× to 3.1 at 0.647×. This would require an undesirable design constraint of a 24.8″/sec scan rate for an 8″ sec process rate. However, the values in Example II (P=0.33) yield a V scan/V process ratio of 1.5 at 1.0× and 2.3 at 0.647×. This enables the system to achieve reasonable precession at 1.0× (12″ sec scan at 8″ sec/precess) and 18.4″/sec at 0.647×. A second feasible set of relationships in a reduction mode would be achieved by setting $V_{m2} = 0.4\ V_{m1}$.

$V_L = 0.2 V_{m1}$ ; $(P = 0.20)$ $V\,\text{scan}/V\,\text{proc} = 1.25$ at $1.0\times$
$= 1.93$ at $.647$

EXAMPLE III

For the system of FIG. 1, the following parameters have been selected:

copy output = 40 cpm (40 scans/minute)
$P_1P_2 = 10''$
$BC = 4''$
$V_L = 5''/\text{sec}$
$V_{m1} = 11.619''/\text{sec}$
$\phi = 10°$
$T_s$ (scan time) = 0.8 sec By solving for $V_{m2}$ in equation (1),
$V_L = (V_{m1} - V_{m2}) \cos \phi$
$5''/\text{sec} = (11.619''/\text{sec} - 2\, V_{m2}) \cos 10°$
$V_{m2} = 3.271''/\text{sec}$ It is noted in this example that mirror 14 will scan a total distance of 9.295 inches or 0.705″ less than the $P_1P_2$ distance. This is due to the fact that the image "walks" along mirror 14 by a distance S, S equal to $V_{m2}\, T_s \sin \phi$.

What is claimed is:

1. An optical system for scanning a stationary object at an object plane and projecting through a lens, light images of said object along an optical path onto a flat portion of a moving photoreceptor in an image plane, said system comprising:
   scanning illumination means for scanning said object, said scan illumination means adapted to decrease the distance between the object plane and the projection lens during each scan cycle, and
   projection means, including said projection lens, positioned between said scanning illumination means and said photoreceptor, said projection means adapted for translation along said optical path so as to compensate for said decreased component of object plane-to-lens distance by projecting said light images onto the photoreceptor in a direction opposite to said photoreceptor motion.

2. The scanning system of claim 1 wherein said scanning illumination means comprises a dual rate scan mirror arrangement including a scan mirror and illumination means moving at a first scan velocity $V_{m1}$ and a second following mirror moving at a velocity $< 0.5\, V_{m1}$.

3. The scanning system of claim 2 wherein said image plane is perpendicular to said object plane and wherein said projection means includes a projection lens and a following mirror, said lens and mirror moving at a third precession velocity $V_L = (V_{m1} - 2\, V_{m2}) \cos \phi$ where $\phi$ is the incident angle at said second following mirror measured with respect to the mirror normal which is parallel to said object plane.

4. The scanning system of claim 2 wherein said image plane is parallel to said object plane and wherein said projection means includes a projection lens and a following mirror, said lens and mirror assembly moving at a third precess velocity $V_L = V_{m1} - 2\, V_{m2}$.

5. The scanning system of claims 2 or 3 wherein said second mirror moves at a velocity of $0.33\, V_{m1}$.

6. The scanning system of claims 2 or 3 wherein said second mirror moves at a velocity of $0.25\, V_{m1}$.

7. The scanning system of claims 2 or 3 wherein said second mirror moves at a velocity of $0.4\, V_{m1}$.

8. The scanning system of claims 3 or 4 wherein said system is operated at a magnification K and wherein precession velocity $V_L$ and process velocity $V_B$ are constant and independent of magnification as defined by the expression $$\frac{V_{m1}}{V_B} = \frac{1}{K\left(1 - \dfrac{V_L}{oV_{m1}}\right)}$$

where $oV_{m1}$ is the scan velocity at $1\times$ magnification.

* * * * *